United States Patent
Silva

(10) Patent No.: US 12,018,784 B2
(45) Date of Patent: Jun. 25, 2024

(54) CONNECTOR AND METHOD FOR CONNECTING PIPES FOR TRANSPORTING FLUIDS

(71) Applicant: R.P.E. S.R.L., Carbonate (IT)

(72) Inventor: Giovanni Silva, Carbonate (IT)

(73) Assignee: R.P.E. S.R.L, Carbonate (IT)

( * ) Notice: Subject to any disclaimer, the term of this patent is extended or adjusted under 35 U.S.C. 154(b) by 0 days.

(21) Appl. No.: 17/836,297

(22) Filed: Jun. 9, 2022

(65) Prior Publication Data
US 2022/0397220 A1    Dec. 15, 2022

(30) Foreign Application Priority Data
Jun. 11, 2021    (IT) .................. 102021000015377

(51) Int. Cl.
*F16L 37/091*    (2006.01)
*F16L 33/035*    (2006.01)
*F16L 33/18*    (2006.01)

(52) U.S. Cl.
CPC ......... *F16L 37/0915* (2016.05); *F16L 33/035* (2013.01); *F16L 33/18* (2013.01)

(58) Field of Classification Search
CPC ... F16L 37/091; F16L 37/0915; F16L 37/107; F16L 37/24
See application file for complete search history.

(56) References Cited

U.S. PATENT DOCUMENTS

| 2017/0009921 A1* | 1/2017 | Hunt | F16L 37/0915 |
| 2019/0107234 A1* | 4/2019 | Corbett | F16L 37/091 |
| 2021/0239248 A1* | 8/2021 | Watson | F16L 37/0915 |
| 2021/0285584 A1* | 9/2021 | Ravisankar | F16L 37/0915 |

FOREIGN PATENT DOCUMENTS

| DE | 19932602 C2 | 7/2002 |
| EP | 1146275 B1 | 6/2004 |
| WO | 2013/056273 A2 | 4/2013 |
| WO | 2021/101383 A2 | 5/2021 |

* cited by examiner

*Primary Examiner* — Zachary T Dragicevich
(74) *Attorney, Agent, or Firm* — Leason Ellis LLP

(57) ABSTRACT

A connector for connecting pipes for transporting fluids has a tubular casing, which extends around a main axis; an end insert, which can be snap coupled to one end of the tubular casing; a tubular sleeve, which is configured to be fitted around a respective fluid transport pipe and to cooperate with the end insert such that a relative rotation around the main axis of the tubular sleeve within the end insert results in a relative displacement of the tubular sleeve with respect to the end insert in a direction substantially parallel to the main axis; and a clamping element, which is housed within the tubular casing and is configured to retain the respective transport pipe.

10 Claims, 5 Drawing Sheets

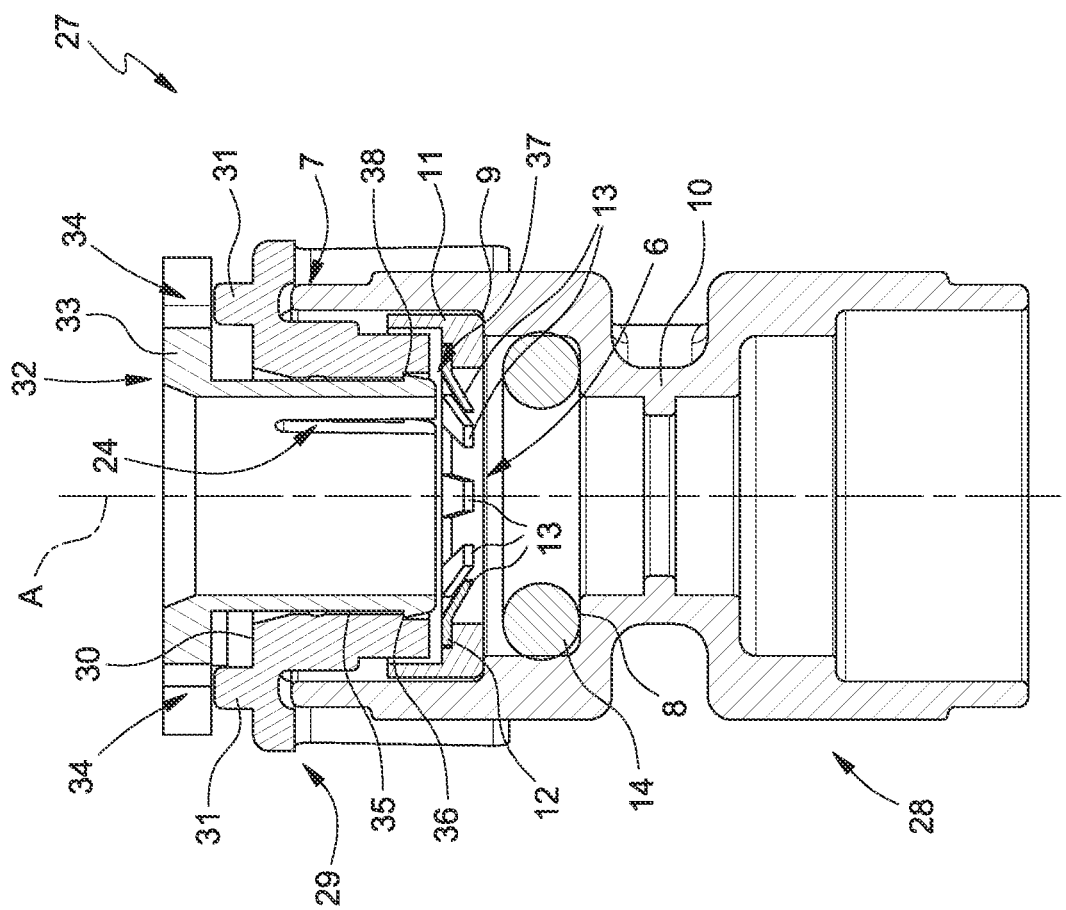

CONNECTOR AND METHOD FOR CONNECTING PIPES FOR TRANSPORTING FLUIDS

CROSS-REFERENCE TO RELATED APPLICATIONS

This patent application claims priority from Italian patent application no. 102021000015377 filed on Jun. 11, 2021, the entire disclosure of which is incorporated herein by reference.

TECHNICAL FIELD OF THE INVENTION

The present invention concerns a connector for connecting pipes for transporting fluids.

Furthermore, the present invention concerns a method for connecting pipes for transporting fluids.

STATE OF THE ART

In the sector of hydraulic connections, quick attachment connectors of the push-fit type are known for connecting hoses, particularly used in the hydraulic circuits of household electrical appliances, such as for example ovens, steam machines and coffee machines.

The connectors of known type generally comprise a tubular casing, which extends around a main axis, and a sleeve, which is configured to be fitted around a respective pipe for transporting fluids and to be inserted by pressure within the tubular casing.

Said connectors are characterised by a quick assembly since it is only necessary to exert pressure on the sleeve along the main axis for engaging and disengaging the sleeve to/from the respective tubular casing.

However, due to the dimensions of the pipes to be connected, which can have a diameter less than 10 millimetres, it is difficult to manually perform the engagement and the disengagement of said connectors.

Moreover, when the pipes to be connected are incorporated in a household electrical appliance or in any other device which comprises a hydraulic circuit, the portions to be connected of said pipes are sometimes difficult to access, often requiring the disassembly of some parts of the household electrical appliance or of the device in order to access the portions of the pipes to be connected or disconnected.

Furthermore, under the effect of unexpected forces or pressures, the connector can accidentally disengage from the pipes to which it is connected, prejudicing the integrity of the hydraulic circuit in which it is incorporated.

SUBJECT AND SUMMARY OF THE INVENTION

An object of the present invention is to manufacture a connector for connecting pipes for transporting fluids which mitigates the drawbacks of the prior art.

In accordance with the present invention, a connector for connecting pipes for transporting fluids is manufactured; the connector comprising:
- a tubular casing, which extends around a main axis;
- an end insert, which can be snap coupled to one end of the tubular casing;
- a tubular sleeve, which is configured to be fitted around a respective fluid transport pipe and to cooperate with the end insert such that a relative rotation around the main axis (A) of the tubular sleeve within the end insert results in a relative displacement of the tubular sleeve with respect to the end insert in a direction substantially parallel to the main axis; and
- a clamping element, which is housed within the tubular casing and is configured to retain the respective transport pipe.

Thanks to the present invention, it is possible to connect pipes for transporting fluids in a simple and quick manner also in the event that the pipes to be connected have a diameter less than 10 millimetres.

Practically, the tubular sleeve is screwable within the end insert. In this manner, it is possible to connect transport pipes exploiting a fastening tool, allowing the connection/disconnection of portions of transport pipes difficult to access, without requiring disassembling parts of a household electrical appliance or of a device in which said pipes are incorporated.

In particular, the tubular sleeve comprises at least one pin; the end insert being provided with at least one internal seat, which is shaped to house a respective pin of the tubular sleeve and to guide said pin along a segment of a helical trajectory, which develops around the main axis.

In this manner, it is possible to convert the rotation of the tubular sleeve around the main axis in a relative displacement of the tubular sleeve with respect to the end insert in a direction substantially parallel to the main axis.

In other words, the relative rotation of the tubular sleeve with respect to the end insert causes the progressive insertion/disinsertion of the tubular sleeve in the end insert.

In particular, the at least one internal seat is shaped to allow a relative displacement of the respective pin of the tubular sleeve with respect to the end insert in a direction substantially parallel to the main axis.

In this manner, it is possible to insert the tubular sleeve in the end insert by means of a pressure on the sleeve in a direction substantially parallel to the main axis, without requiring a relative rotation of the tubular sleeve with respect to the end insert.

In particular, the tubular sleeve comprises two pins and the end insert is provided with two respective internal seats.

In this manner, it is possible to guide with precision the progressive insertion of the tubular sleeve in the end insert.

In particular, the clamping element comprises a toothed washer so as to retain the respective transport pipe when it is completely inserted within the tubular casing.

Furthermore, the connector comprises an annular sealing element, preferably made of a polymeric material, which is housed within the tubular casing at a distance from the clamping element and is configured to interfere with the fluid transport pipe, so as to prevent the outflow of fluid from the tubular casing.

In particular, the connector comprises an annular spacer, which is placed on an inner shoulder of the tubular casing and is shaped to support the clamping element at a distance from the annular sealing element, so as to allow a deformation of the clamping element when it enters into contact with the tubular sleeve.

In particular, the tubular sleeve is provided at one end with a collar shaped to allow a fastening tool to be gripped thereon.

In this manner, it is possible to screw the tubular sleeve to the end insert by means of a suitable fastening tool, such as for example an adjustable spanner.

In particular, the tubular casing comprises a plurality of engaging elements, each of which is placed on the outer surface of the tubular casing and is provided with a chamfered portion; the end insert comprising a coupling portion provided with a plurality of openings, each of which is configured to house a respective engaging element of the tubular casing.

In this manner, it is possible to snap couple the end insert with the tubular casing.

In particular, the tubular casing, the end insert and the tubular sleeve are preferably made of respective polymeric materials so as to make the manufacturing of the connector simple and cost-effective.

In accordance with a further embodiment of the present invention, a connector for connecting pipes for transporting fluids is manufactured; the connector comprising:

a tubular casing, which extends around a main axis;

an end insert, which can be snap coupled to one end of the tubular casing and comprises an upper wall provided with at least one pin; and a tubular sleeve, which is configured to be fitted around a respective fluid transport pipe and to cooperate with the end insert so as to be snap engaged/disengaged to the end insert by means of a force exerted on the tubular sleeve in a direction substantially parallel to the main axis;

the tubular sleeve comprising at one end a collar provided with at least one opening, which is shaped to receive the respective pin during a displacement of the tubular sleeve towards the end insert in a direction substantially parallel to the main axis.

In this manner, by rotating the tubular sleeve with respect to the end insert around the main axis when the tubular sleeve is engaged to the end insert, it is possible to prevent a force exerted on the tubular sleeve in a direction substantially parallel to the main axis and directed towards the end insert from causing an accidental disengagement of the tubular sleeve from the end insert. In such circumstance, the collar interferes with the at least one pin preventing the displacement of the tubular sleeve towards the end insert.

In order to disengage the tubular sleeve from the end insert, it is necessary to rotate the tubular sleeve with respect to the end insert around the main axis so that the at least one pin is aligned with the respective opening and to subsequently press the tubular sleeve towards the end insert.

In particular, the end insert comprises an inner surface provided with an inner shoulder; the tubular sleeve comprising an engaging portion, which is configured to interfere with the inner shoulder so as to snap engage/disengage with the end insert.

In this manner, it is possible to allow the movement for the disengagement of the transport pipe in a simple and quick manner.

A further object of the present invention is to provide a method for connecting transport pipes which mitigates the drawbacks of the prior art.

In accordance with the present invention, a method for connecting pipes for transporting fluids is provided; the method comprising the steps of:

snap coupling an end insert to one end of a tubular casing, which extends around a main axis;

fitting a tubular sleeve around a respective fluid transport pipe;

rotating around the main axis the tubular sleeve within the end insert so as to cause a relative displacement of the tubular sleeve with respect to the end insert in a direction substantially parallel to the main axis; and retaining the tubular sleeve within the tubular casing.

Thanks to the present method, it is possible to connect fluid transport pipes by means of an insertion by pressure of the tubular sleeve in the end insert and it is possible to disconnect fluid transport pipes by means of a screwing of the tubular sleeve in the end insert.

In this manner, it is possible to ensure a simple and quick connection and disconnection also in the event that the pipes to be connected/disconnected have a diameter less than 10 millimetres and allowing the use of fastening tools.

BRIEF DESCRIPTION OF THE DRAWINGS

Further characteristics and advantages of the present invention will be apparent from the following description of non-limiting example embodiments, with reference to the accompanying figures, wherein:

FIG. 7 is a sectional view, with parts removed for clarity, of the connector of FIG. 6.

DETAILED DESCRIPTION OF PREFERRED EMBODIMENTS OF THE INVENTION

Figure 1:
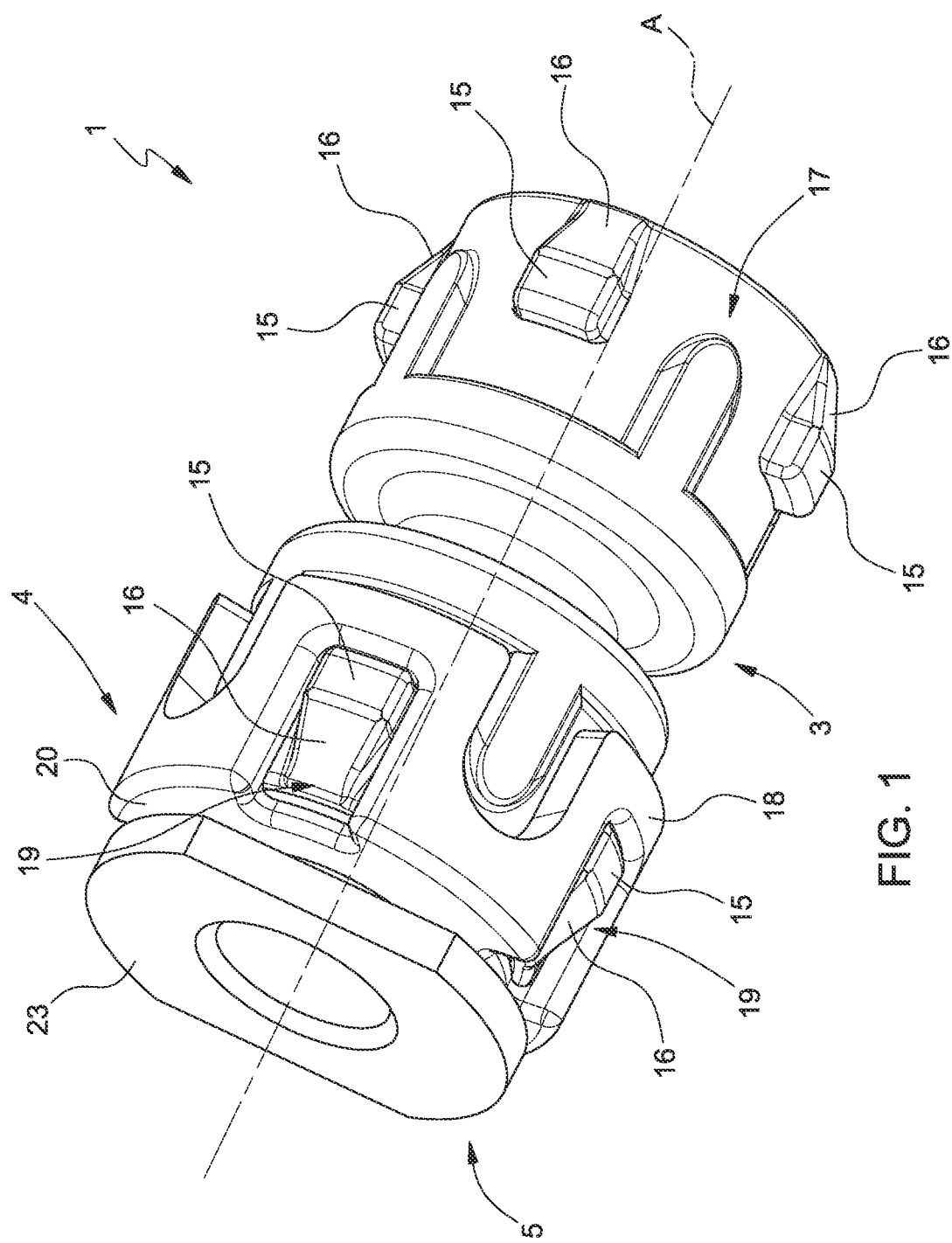
FIG. 1 is a perspective view, with parts removed for clarity, of a connector for connecting pipes for transporting fluids manufactured in accordance with the present invention.
Figure 3:
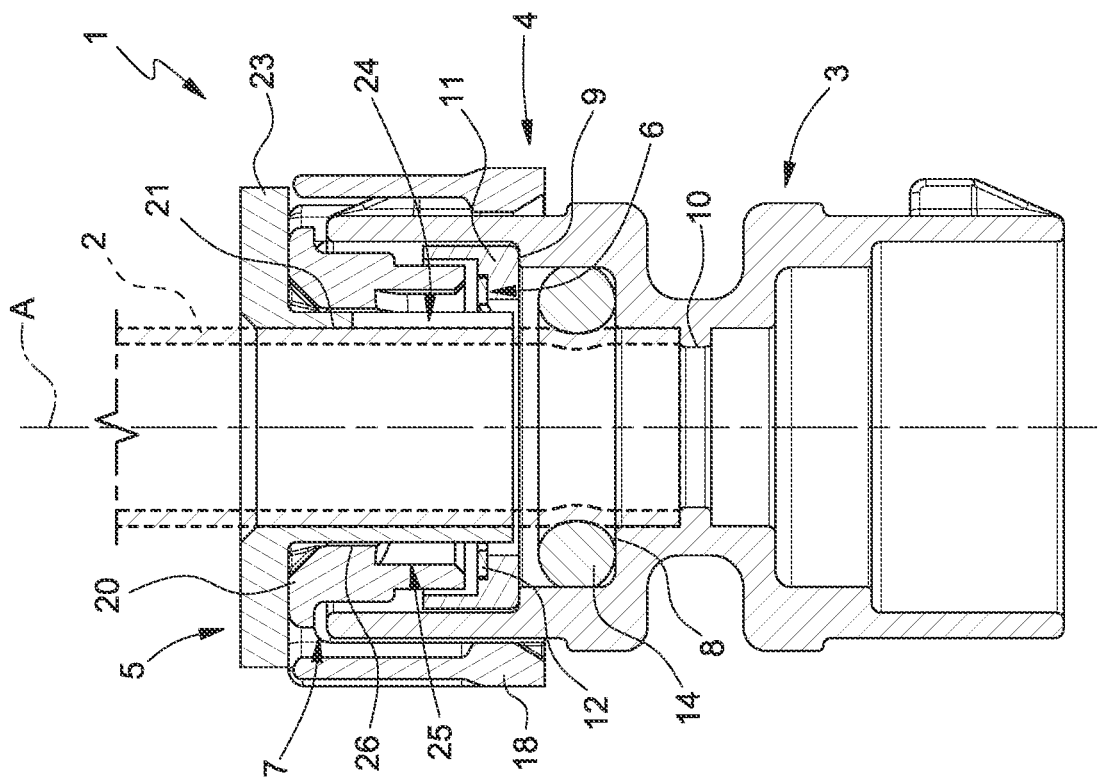
FIGS. 2 and 3 are sectional views, with parts removed for clarity, of the connector of FIG. 1 in respective operational configurations.
Figure 2:
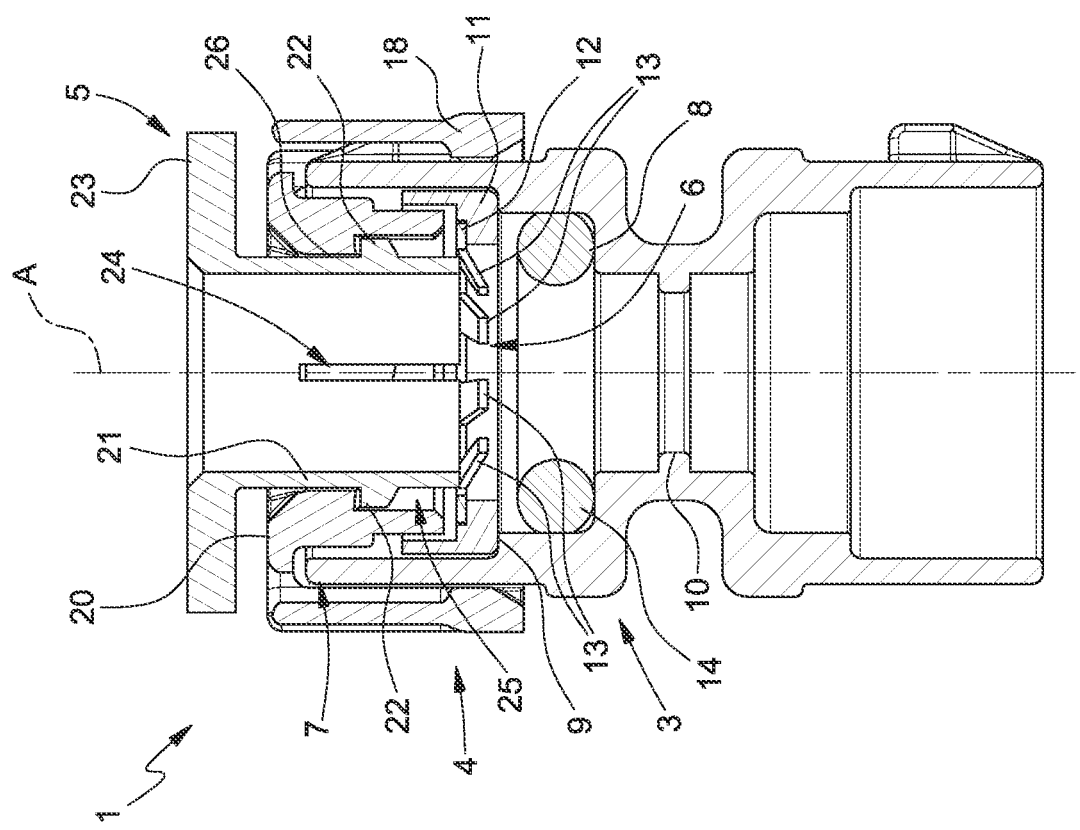

With reference to FIGS. 1-3, reference numeral 1 indicates, as a whole, a connector for connecting ends of two fluid transport pipes 2 (FIG. 3). The connector 1 can also be used for connecting one end of a transport pipe 2 (FIG. 3) to a further hydraulic element, such as for example a pump or a valve or a tank.

The connector 1 is particularly applicable to hydraulic circuits of household electrical appliances, such as for example ovens, steam machines and coffee machines, without thereby limiting the wide range of possible applications of the present invention.

The connector 1 comprises a tubular casing 3, which extends around a main axis A; an end insert 4, which can be snap coupled to one end of the tubular casing 3; a tubular sleeve 5, which is configured to be fitted around a respective fluid transport pipe 2 (FIG. 3) and to cooperate with the end insert 4 such that a relative rotation around the main axis A of the tubular sleeve 5 within the end insert 4 results in a relative displacement of the tubular sleeve 5 with respect to the end insert 4 in a direction substantially parallel to the main axis A; and a clamping element 6 (FIGS. 2 and 3), which is housed within the tubular casing 3 and is configured to retain the respective transport pipe 2.

In particular, the tubular casing 3, the end insert 4 and the tubular sleeve 5 are made of respective polymeric materials.

With reference to FIGS. 2 and 3, the tubular casing comprises an end 7; an inner shoulder 8; an inner shoulder 9 placed between the end 7 and the inner shoulder 8 at a distance from the inner shoulder 8 along the main axis A; and a narrowing 10 configured to provide an abutment surface for one end of each transport pipe 2 (FIG. 3) so as to clamp the sliding of each transport pipe 2 (FIG. 3) in a direction substantially parallel to the main axis A when said transport pipe 2 (FIG. 3) is inserted within of the tubular casing 3.

The connector 1 comprises an annular spacer 11, which is placed on the inner shoulder 9 and is shaped to support the clamping element 6.

In particular, the clamping element 6 comprises a toothed washer 12 provided with a plurality of flexible teeth 13 facing each other. Practically, each flexible tooth 13 is configured to deflect when said flexible tooth 13 enters into contact with the tubular sleeve 5 during the insertion of the tubular sleeve 5 within the tubular casing 3.

Furthermore, the connector 1 comprises an annular sealing element 14, preferably made of a polymeric material, which is housed within the tubular casing 3 at a distance from the clamping element 6 and is configured to interfere with the fluid transport pipe 2 (FIG. 3).

In particular, the annular sealing element 14 is an O-ring. The term "O-ring" means a rubber ring used as mechanical gasket. The O-rings are designed to be inserted in suitable housings and to be compressed during the assembly of two or more parts, thus creating a sealing gasket.

More specifically, the annular sealing element 14 is supported by the inner shoulder 8. In this manner, the annular sealing element 14 is placed at such a distance from the clamping element 6 to allow the deflection of each flexible tooth 13 without said flexible tooth 13 entering into contact with the annular sealing element 14 during the insertion of the tubular sleeve 5 within the tubular casing 3.

With reference to FIG. 1, the tubular casing 3 comprises a plurality of engaging elements 15, each of which is placed on the outer surface of the tubular casing 3 at the end 7 and is provided with a chamfered portion 16. More specifically, the tubular casing 3 comprises four engaging elements 15 uniformly distributed on the outer surface of the tubular casing 3 and a seat 17 obtained in the outer surface of the tubular casing 3 and placed around the engaging elements 15.

The end insert 4 comprises a coupling portion 18 provided with a plurality of openings 19, each of which is configured to house a respective engaging element 15 of the tubular casing 3. In particular, the coupling portion 18 is ring-shaped and is configured to be housed within the seat 17 by means of a snap coupling.

Furthermore, the end insert 4 comprises an upper wall 20, which is substantially flat and is configured to provide an abutment surface for the tubular sleeve 5 so as to clamp the sliding of the tubular sleeve 5 in a direction substantially parallel to the main axis A when the tubular sleeve 5 is inserted within the tubular casing 3.

In the non-limiting case of the present invention described and illustrated herein, the tubular casing 3 extends symmetrically with respect to a symmetry plane P perpendicular to the main axis A and intersecting the narrowing 10. In accordance with such configuration, the connector 1 comprises a pair of end inserts 4, a pair of tubular sleeves 5, a pair of clamping elements 6, a pair of annular spacers 11 and a pair of annular sealing elements 14.

In accordance with a further embodiment, not shown in the accompanying figures, the narrowing 10 is placed in the proximity of one end of the tubular casing 3 along the main axis A.

Figure 4:
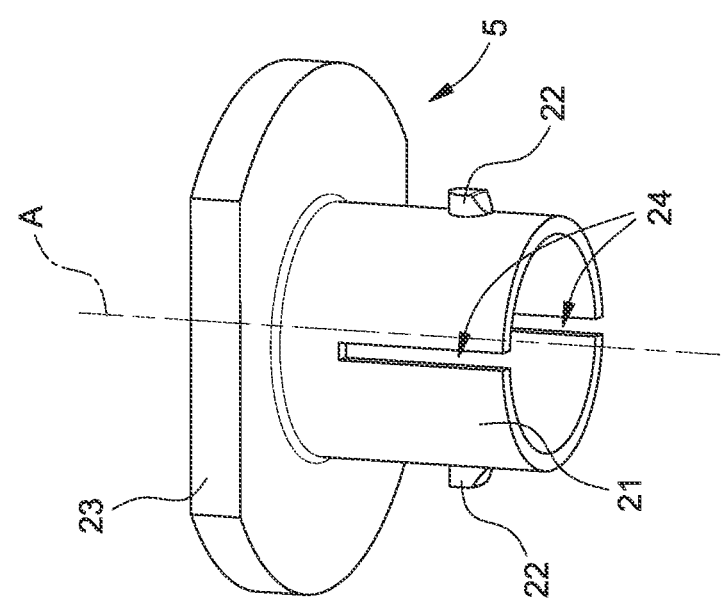
FIG. 4 is a perspective view of a tubular sleeve of the connector of FIG. 1.

With reference to FIG. 4, the tubular sleeve 5 comprises a tubular portion 21; two pins 22, each of which is placed on the outer surface of the tubular portion 21; and a collar 23 shaped to allow the fastening tool to be gripped thereon, not shown in the accompanying figures.

The tubular portion 21 is provided with two notches 24 configured to favour the deformation of the tubular portion 21 during the insertion of the tubular sleeve 5 within the tubular casing 3.

Figure 5:
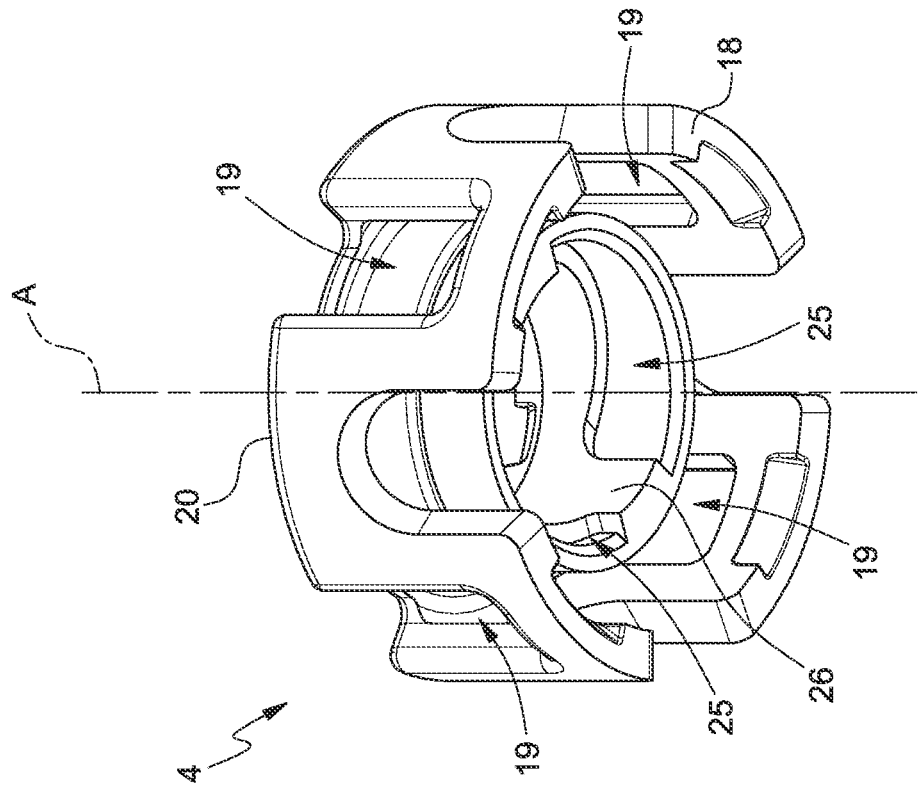
FIG. 5 is a perspective view of an end insert of the connector of FIG. 1.

With reference to FIG. 5, the end insert 4 is provided with two internal seats 25, each of which is obtained in a cylindrical inner wall 26 of the end insert 4.

Each internal seat 25 is shaped to house a respective pin 22 of the tubular sleeve 5 and to guide said pin 22 along a segment of a helical trajectory, which develops around the main axis A.

In particular, the segment of helical trajectory defined by each internal seat 25 is shaped to cause a displacement of the tubular sleeve 5 of the order of a few millimetres in a direction substantially parallel to the main axis A.

Furthermore, each internal seat 25 is shaped to allow the relative displacement of the respective pin 22 of the tubular sleeve 5 with respect to the end insert 4 in a direction substantially parallel to the main axis A.

Figure 6:
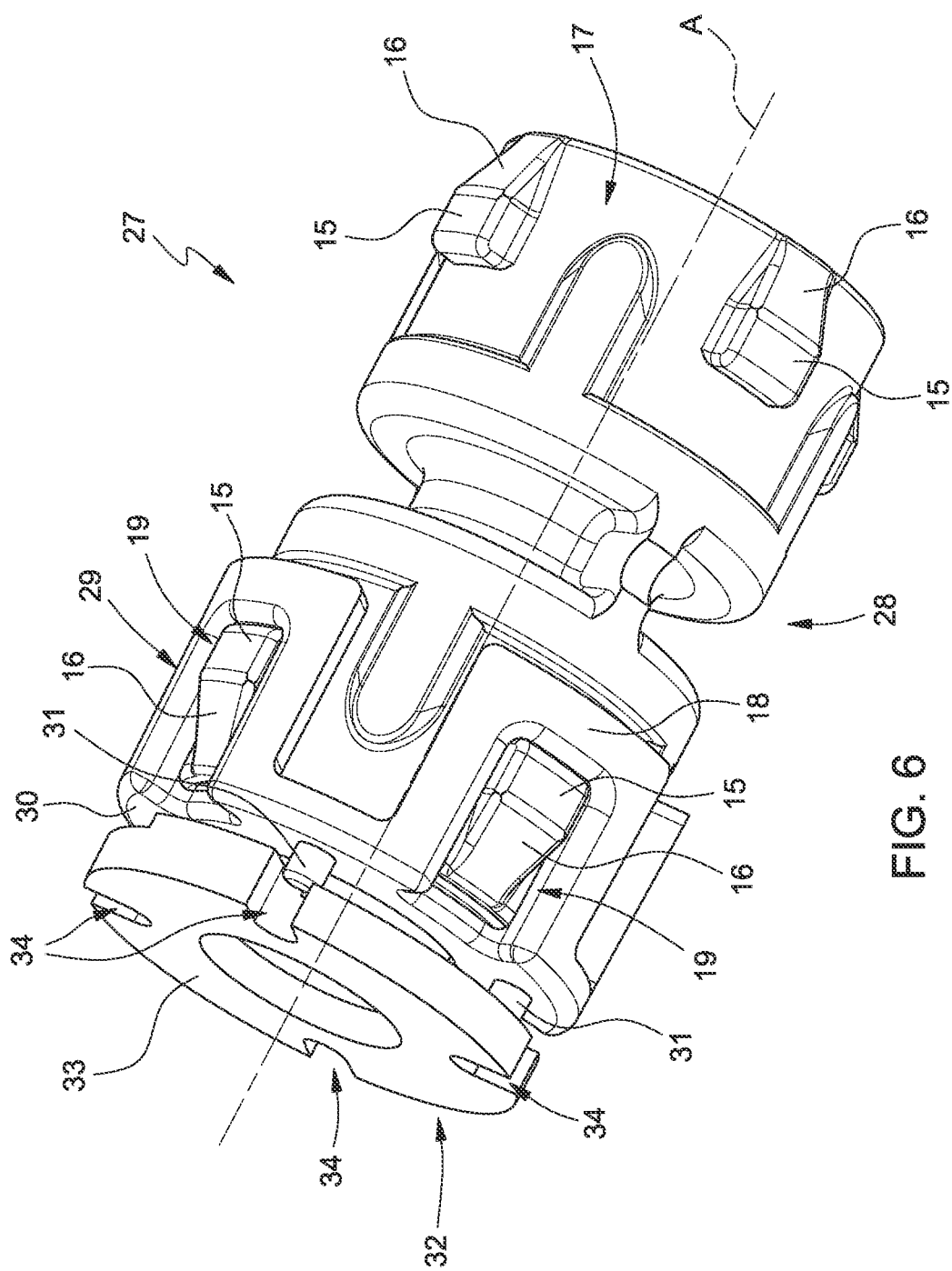
FIG. 6 is a perspective view, with parts removed for clarity, of a connector for connecting pipes for transporting fluids manufactured in accordance with a further embodiment of the present invention.

With reference to FIGS. 6 and 7, a connector 27 for connecting fluid transport pipes 2 (FIG. 3) is shown manufactured in accordance with a further embodiment of the present invention.

The connector 27 comprises a tubular casing 28, which extends around a main axis A; an end insert 29, which can be snap coupled to one end of the tubular casing 28 and comprises an upper wall 30 provided with at least one pin 31; a tubular sleeve 32, which is configured to be fitted around a respective fluid transport pipe 2 (FIG. 3) and to cooperate with the end insert 29 so as to be snap engaged/disengaged to the end insert 29 by means of a force exerted on the tubular sleeve 32 in a direction substantially parallel to the main axis A.

The tubular sleeve 32 comprises at one end a collar 33 provided with at least one opening 34, which is shaped to receive the respective pin 31 during the displacement of the tubular sleeve 32 towards the end insert 29 in a direction substantially parallel to the main axis A.

In particular, the end insert 29 comprises four pins 31, uniformly distributed on the upper wall 30 around the main axis A. The collar 33 is provided with four openings 34 uniformly distributed around the main axis A.

More specifically, each pin 31 extends from the upper wall 30 along a direction substantially parallel to the main axis A.

With reference to FIG. 7, the end insert 29 comprises an inner surface 35 provided with an inner shoulder 36. The tubular sleeve 32 comprises at one end a engaging portion 37, which is provided with a step 38 and is configured to interfere with the inner shoulder 36 so as to snap engage/disengage with the end insert 29.

Similarly to the connector 1 shown in FIGS. 1-3, the connector 27 comprises the clamping element 6, which is housed within the tubular casing 28 and is configured to retain the fluid transport pipe 2 (FIG. 3); the annular spacer 11, which is shaped to support the clamping element 6; and the annular sealing element 14, preferably made of a polymeric material, which is configured to interfere with the fluid transport pipe 2 (FIG. 3).

In use and with reference to FIG. 2, the tubular sleeve 5 is inserted in the end insert 4 in a first position, in which each pin 22 is housed in the respective internal seat 25 and the collar 23 is positioned at a distance from the upper wall 20 of the end insert 4.

With reference to FIG. 3, a fluid transport pipe 2 is inserted within the tubular casing 3 passing through the tubular sleeve 5, the clamping element 6 and the annular sealing element 14 such that the end of the fluid transport pipe 2 enters into contact with the narrowing 10.

Subsequently, the tubular sleeve 5 is rotated with respect to the end insert 4 around the main axis A, causing the displacement along the main axis A of the tubular sleeve 5 up to a second position, in which the tubular sleeve 5 is clamped within the end insert 4 and the collar 23 is in abutment against the upper wall 20.

More specifically, the rotation of the tubular sleeve 5 around the main axis A causes the sliding of each pin 22 in the respective internal seat 25, which guides the respective pin 22 along a segment of a helical trajectory causing the displacement of the tubular sleeve 5 between the first and the second positions.

The rotation of the tubular sleeve 5 can be carried out by means of a fastening tool, not shown in the accompanying figures.

In the displacement of the tubular sleeve 5 from the first to the second positions, the tubular portion 21 of the tubular sleeve 5 enters into contact with said flexible teeth 13 of the toothed washer 12, causing the deflection of the flexible teeth 13 and the deformation of the tubular portion 21, and consequently clamping the tubular sleeve 5 within the tubular casing 3. In this manner, the fluid transport pipe 2 is compressed within the tubular portion 21 of the tubular sleeve 5, clamping the sliding of the fluid transport pipe 2 in a direction substantially parallel to the main axis A.

In accordance with an alternative mode of inserting the tubular sleeve 5 within the end insert 4, the collar 23 of the tubular sleeve 5 is pushed by pressure towards the upper wall 20 of the end insert 4 in a direction substantially parallel to the main axis A. In such circumstance, the tubular sleeve 5 slides in a direction substantially parallel to the main axis A, without requiring a relative rotation of the tubular sleeve 5 with respect to the end insert 4 around the main axis A.

More specifically, the insertion of the tubular sleeve 5 within the end insert 4 causes the sliding in a direction substantially parallel to the main axis A of each pin 22 in the respective internal seat 25.

It is finally evident that variations can be made to the present invention with respect to the described embodiments without thereby departing from the scope of protection of the appended claims.

The invention claimed is:

1. A connector for connecting pipes for transporting fluids; the connector (1) comprising:
    a tubular casing (3), which extends around a main axis (A) and comprises a plurality of engaging elements (15), each of which is placed on the outer surface of the tubular casing (3) and is provided with a chamfered portion (16);
    an end insert (4), which can be snap coupled to one end (7) of the tubular casing (3) and comprises a coupling portion (18) provided with a plurality of openings (19), each of which is configured to house a respective engaging element (15) of the tubular casing (3);
    a tubular sleeve (5), which is configured to be fitted around a respective fluid transport pipe (2) and to cooperate with the end insert (4) such that a relative rotation around the main axis (A) of the tubular sleeve (5) within the end insert (4) results in a relative displacement of the tubular sleeve (5) with respect to the end insert (4) in a direction substantially parallel to the main axis (A); and
    a clamping element (6), which is housed within the tubular casing (3) and is configured to retain the respective transport pipe (2).

2. The connector as claimed in claim 1,
    wherein the tubular sleeve (5) comprises at least one pin (22);
    wherein the end insert (4) is provided with at least one internal seat (25), which is shaped to house a respective pin (22) of the tubular sleeve (5) and to guide said pin (22) along a segment of a helical trajectory, which develops around the main axis (A);
    the at least one internal seat (25) being shaped so as to allow a relative displacement of the respective pin (22) of the tubular sleeve (5) with respect to the end insert (4) in a direction substantially parallel to the main axis (A).

3. The connector as claimed in claim 1, wherein the tubular sleeve (5) comprises two pins (22) and the end insert (4) is provided with two respective internal seats (25).

4. The connector as claimed in claim 1, wherein the clamping element (6) comprises a toothed washer (12).

5. The connector as claimed in claim 1, and comprising an annular sealing element (14), which is housed within the tubular casing (3) at a distance from the clamping element (6) and is configured to interfere with the fluid transport pipe (2).

6. The connector as claimed in claim 1, and comprising an annular spacer (11), which is placed on an inner shoulder (9) of the tubular casing (3) and is shaped to support the clamping element (6).

7. The connector as claimed in claim 1, wherein the tubular sleeve (5) is provided at one end with a collar (23) shaped so as to allow a fastening tool to be gripped thereon.

8. The connector as claimed in claim 1, wherein the tubular casing (3), the end insert (4) and the tubular sleeve (5) are made of respective polymeric materials.

9. A connector for connecting pipes for transporting fluids; the connector (1) comprising:
    a tubular casing (3), which extends around a main axis (A);
    an end insert (4), which can be snap coupled to one end (7) of the tubular casing (3);
    a tubular sleeve (5), which comprises at least one pin (22) and is configured to be fitted around a respective fluid transport pipe (2) and to cooperate with the end insert (4) such that a relative rotation around the main axis (A) of the tubular sleeve (5) within the end insert (4) results in a relative displacement of the tubular sleeve (5) with respect to the end insert (4) in a direction substantially parallel to the main axis (A); and
    a clamping element (6), which is housed within the tubular casing (3) and is configured to retain the respective transport pipe (2);
    the end insert (4) is being provided with at least one internal seat (25), which is shaped to house a respective pin (22) of the tubular sleeve (5) and to guide said pin (22) along a segment of a helical trajectory, which develops around the main axis (A);
    the at least one internal seat (25) being shaped so as to allow a relative displacement of the respective pin (22) of the tubular sleeve (5) with respect to the end insert (4) in a direction substantially parallel to the main axis (A);
    wherein the tubular casing (3) comprises a plurality of engaging elements (15), each of which is placed on the outer surface of the tubular casing (3) and is provided with a chamfered portion (16); the end insert (4) comprising a coupling portion (18) provided with a plurality of openings (19), each of which is configured to house a respective engaging element (15) of the tubular casing (3).

10. A method for connecting pipes for transporting fluids; the method comprising the steps of:
- providing a tubular casing (3) extending around a main axis (A) and comprising a plurality of engaging elements (15), each of which is placed on the outer surface of the tubular casing (3) and is provided with a chamfered portion (16);
- snap coupling an end insert (4) to an end (7) of a tubular casing (3), which extends around a main axis (A), the end insert (4) comprising a coupling portion (18) provided with a plurality of openings (19), each of which is configured to house a respective engaging element (15) of the tubular casing (3);
- fitting a tubular sleeve (5) around a respective fluid transport pipe (2);
- rotating around the main axis (A) the tubular sleeve (5) within the end insert (4) so as to cause a relative displacement of the tubular sleeve (5) with respect to the end insert (4) in a direction substantially parallel to the main axis (A); and
- retaining the tubular sleeve (5) within the tubular casing (3).

\* \* \* \* \*